United States Patent [19]
Mori

[11] Patent Number: 5,923,360
[45] Date of Patent: Jul. 13, 1999

[54] PRINTING CONTROL APPARATUS

[75] Inventor: Hiromi Mori, Nagoya, Japan

[73] Assignee: Brother Kogyo Kabushiki Kaisha, Aichi-ken, Japan

[21] Appl. No.: 08/755,116

[22] Filed: Nov. 22, 1996

[30] Foreign Application Priority Data

Nov. 30, 1995 [JP] Japan .................................. 7-338296

[51] Int. Cl.⁶ ............................................... G03G 15/00
[52] U.S. Cl. ........................... 347/262; 347/264; 399/75; 399/81; 399/364
[58] Field of Search .................................. 347/262, 264, 347/139, 153; 399/401, 402, 371, 75, 81, 364

[56] References Cited

U.S. PATENT DOCUMENTS

| | | | |
|---|---|---|---|
| 4,855,790 | 8/1989 | Suzuki | 355/24 |
| 4,978,980 | 12/1990 | Noguchi et al. | 205/717 |
| 4,990,941 | 2/1991 | Kawai | 347/153 |
| 5,012,434 | 4/1991 | Zietlow et al. | 347/129 |
| 5,055,946 | 10/1991 | Kurahashi et al. | 358/498 |
| 5,241,397 | 8/1993 | Yamada | 358/296 |
| 5,257,035 | 10/1993 | Funahashi et al. | 347/139 |
| 5,696,850 | 12/1997 | Parulski et al. | 358/909.1 |

FOREIGN PATENT DOCUMENTS 62-134282  6/1987  Japan .

Primary Examiner—N. Le
Assistant Examiner—Hai C. Pham
Attorney, Agent, or Firm—Kane, Dalsimer, Sullivan, Kurucz, Levy, Eisele and Richard, LLP

[57] ABSTRACT

Disclosed is the printing system 1 including the printer 2 and the personal computer 51 through which the command combination is selected according to kind of the print sheet A among four command combinations (the first combination is defined by both the print order standard command and the print direction standard command, and corresponds to pattern 1; the second combination is defined by the sheet plane standard command and the print direction standard command, and corresponds to pattern 2; the third combination is defined by the print order standard command and the sheet direction standard command, and corresponds to pattern 3; the fourth combination is defined by the sheet plane standard command and the sheet direction standard command, and corresponds to pattern 4), further the print condition is determined by the selected command combination, thereby image printing is conducted in the two-sided printing mode by the printer 2 under print control by the personal computer 51 while reversing the feed direction of the print sheet A in the reversing unit 23.

19 Claims, 8 Drawing Sheets

PRINTING CONTROL APPARATUS

BACKGROUND OF THE INVENTION

1. Field of the Invention

The present invention relates to a printing control apparatus capable of conducting two-sided printing on a print sheet by reversing feed direction thereof, and in particular, relates to a printing control apparatus in which print condition including print order and print direction of image extended over two pages can be set according to kinds of print sheet, thereby it can conduct two-sided printing in various manners.

2. Description of Related Art

Conventionally, it is proposed various printing apparatuses such as laser printer capable of conducting both single-sided printing and two-sided printing. In these printing apparatuses, various manners to enable the two-sided printing are adopted. For instance, it is known a manner in which the two-sided printing is realized by reversing feed direction of the print sheet, thereby inside and outside of the print sheet are reversed, in order to efficiently reduce space and cost of the printing apparatus.

For example, in the laser printer, the two-sided printing is conducted as follows. That is, after image printing is done on the first plane of the print sheet it is fed to a predetermined reversing position and feed direction thereof is reversed at the reversing position, thereby the rear end of the print sheet after image is printed on the first plane reversely becomes the front end along the reversed feed direction. And when the print sheet is fed to a print part including a photosensitive drum, the second plane of the print sheet opposes to the photosensitive drum and image printing is conducted on the second plane.

And in the above laser printer, the two-sided printing is done on the print sheet so that printing directions in both single-sided printing mode and two-sided printing mode mutually coincide. Here, concretely, in case of the single-sided printing mode, image is printed on the fed print sheet according to the same direction as the feed direction thereof. On the other hand, in case of the two-sided printing mode, image is first printed on the first plane under a condition that print format is rotated 180° (degrees) against the feed direction of the print sheet and further image is printed on the second plane according to the same direction as the feed direction thereof, similar to the case of the single-sided printing mode.

However, there remain following problems in the above printer that the two-sided printing is conducted by reversing the feed direction of the print sheet. That is, in the two-sided printing mode, after image printing is conducted on the second plane of the print sheet continuous to image printing of the first plane, the print sheet is fed out to a sheet discharge tray. At that time, the print sheet is stacked on the sheet discharge tray so that the second plane on which image printing is lately conducted becomes under plane. But, in case that image is printed over several pages, page number printed on the print sheet cannot become serial number because the print sheets are stacked on the sheet discharge tray one by one under a condition that the second plane on which content of the second page is printed become under planes. Therefore, it is necessary for a user to rearrange the print sheets in good order after printing is completed and such rearrangement is very troublesome.

Here, there is no problem in the above printer when image is printed on a white print sheet since there is no distinction of inside and outside, top and bottom in the print sheet. But, there will occur a problem that the print sheet is reversed in case of two-sided printing when a kind of print sheet having pre-prints thereon by which print direction is predetermined, is used.

For instance, in case that the print sheet having company name printed thereon is utilized and such print sheet is arranged in a sheet supply cassette so that the upper end thereof coincides with the top end of feed direction according to the single-sided printing mode, there will be no problem in printing under the single-sided printing mode. However, in case of the two-sided printing mode, image is printed after the print format is rotated 180° when image printing is conducted on the first plane of the print sheet, thereby there will occur a case that printing directions of the company name and the printed content do not coincide with each other, as a result, both the company name and the printed content are arranged on the print sheet in a condition that reading directions thereof become different from each other.

In order to dissolve the above problems, it is conceivable that the sheet supply cassette is independently arranged for each of the single-sided printing mode and the two-sided printing mode. However, in this case, there will arise a new problem that it is very troublesome for a user of the printer. At that time, it is understandable that the company name and the printed content are put in order if the feed direction of the print sheet having pre-prints thereon is reversed in the two-sided printing mode.

SUMMARY OF THE INVENTION

Accordingly, it is an object of the present invention to overcome the above mentioned problems and to provide a printing control apparatus in which printing order and printing direction can suitably combine according to kinds of print sheets, thereby image printing can be flexibly conducted in both the single-sided printing mode and the two-sided printing mode in spite of kinds of the print sheets.

In order to accomplish the above object, the present invention according to claim 1 provides a printing control apparatus including image formation means for forming image on a print sheet, sheet supply means for supplying the print sheet to the image formation means, reversing means for reversing feed direction of the print sheet having the image formed thereon, discharge means for discharging the print sheet after image formation is completed, the printing control apparatus having single-sided printing mode under which the print sheet in the sheet supply means is supplied to the image formation means while retaining one end thereof as a feed top end and is discharged by the discharge means while retaining the one end thereof as the feed top end after the image is formed on one plane of the print sheet, and two-sided printing mode under which the print sheet in the sheet supply means is supplied to the image formation means while retaining one end thereof as a feed top end and is returned to the sheet supply means while retaining the other end thereof as the feed top end by the reversing means after the image is formed on one plane of the print sheet, thereafter the print sheet is again supplied to the image formation means while retaining the other end thereof as the feed top end and is discharged by the discharge means while retaining the other end thereof as the feed top end after the image is formed on the other plane of the print sheet, the printing control apparatus comprising:

print order standard mode that the image of the latter page among continuous two pages is formed on the one plane of the print sheet when the image is formed on the one plane under the two-sided printing mode and the image of the former page among continuous two pages is formed on the other plane of the print sheet when the image is formed on the other plane, thereby print order of the print sheet discharged by the discharge means becomes same under both the single-sided printing mode and the two-sided printing mode; and sheet plane standard mode that the image of the former page among continuous two pages is formed on the one plane of the print sheet when the image is formed on the one plane under the two-sided printing mode and the image of the latter page among continuous two pages is formed on the other plane of the print sheet when the image is formed on the other plane, thereby sheet plane on which the image is formed becomes same under both the single-sided printing mode and the two-sided printing mode.

And the printing control apparatus according to claim 5 further has print direction standard mode that the image is formed on the one plane of the print sheet based on first print format obtained by rotating 180° print format in the single-sided printing mode when the image is formed on the one plane under the two-sided printing mode and the image is formed on the other plane of the print sheet based on second print format same as the print format of the single-sided printing mode when the image is formed on the other plane, thereby sheet discharge direction and print direction mutually coincide under both the single-sided printing mode and the two-sided printing mode; and sheet direction standard mode that the image is formed on the one plane of the print sheet based on the second print format when the image is formed on the one plane under the two-sided printing mode and the image is formed on the other plane of the print sheet based on the first print format when the image is formed on the other plane, thereby sheet direction itself and the print direction mutually coincide under both the single-sided printing mode and the two-sided printing mode.

According to the printing control apparatus of the present invention, the printing control apparatus is capable of printing under both the single-sided printing mode and the two-sided printing mode and has the print order standard mode that the image of the latter page among continuous two pages is formed on the one plane of the print sheet when the image is formed on the one plane under the two-sided printing mode and the image of the former page among continuous two pages is formed on the other plane of the print sheet when the image is formed on the other plane, thereby print order of the print sheet discharged by the discharge means becomes same under both the single-sided printing mode and the two-sided printing mode, and the sheet plane standard mode that the image of the former page among continuous two pages is formed on the one plane of the print sheet when the image is formed on the one plane under the two-sided printing mode and the image of the latter page among continuous two pages is formed on the other plane of the print sheet when the image is formed on the other plane, thereby sheet plane on which the image is formed becomes same under both the single-sided printing mode and the two-sided printing mode, as claimed in claim 1.

Therefore, image printing can be conducted on both planes of the print sheet according to the correct direction so as to be able to correctly read the image by selecting one of the modes based on kind of the print sheet.

Further, the printing control apparatus has the print direction standard mode that the image is formed on the one plane of the print sheet based on first print format obtained by rotating 180° print format in the single-sided printing mode when the image is formed on the one plane under the two-sided printing mode and the image is formed on the other plane of the print sheet based on second print format same as the print format of the single-sided printing mode when the image is formed on the other plane, thereby sheet discharge direction and print direction mutually coincide under both the single-sided printing mode and the two-sided printing mode, and the sheet direction standard mode that the image is formed on the one plane of the print sheet based on the second print format when the image is formed on the one plane under the two-sided printing mode and the image is formed on the other plane of the print sheet based on the first print format when the image is formed on the other plane, thereby sheet direction itself and the print direction mutually coincide under both the single-sided printing mode and the two-sided printing mode, as claimed in claim 5.

Therefore, image printing can be conducted on both planes of the print sheet having pre-prints thereon according to the correct direction so as to be able to correctly read the image by selecting one of the modes based on kind of the print sheet.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The present invention will be described with reference to the following drawings, wherein.

DETAILED DESCRIPTION OF THE PREFERRED EMBODIMENTS

A detailed description of the preferred embodiment embodying the present invention will now be given referring to the accompanying drawings.

Figure 1:
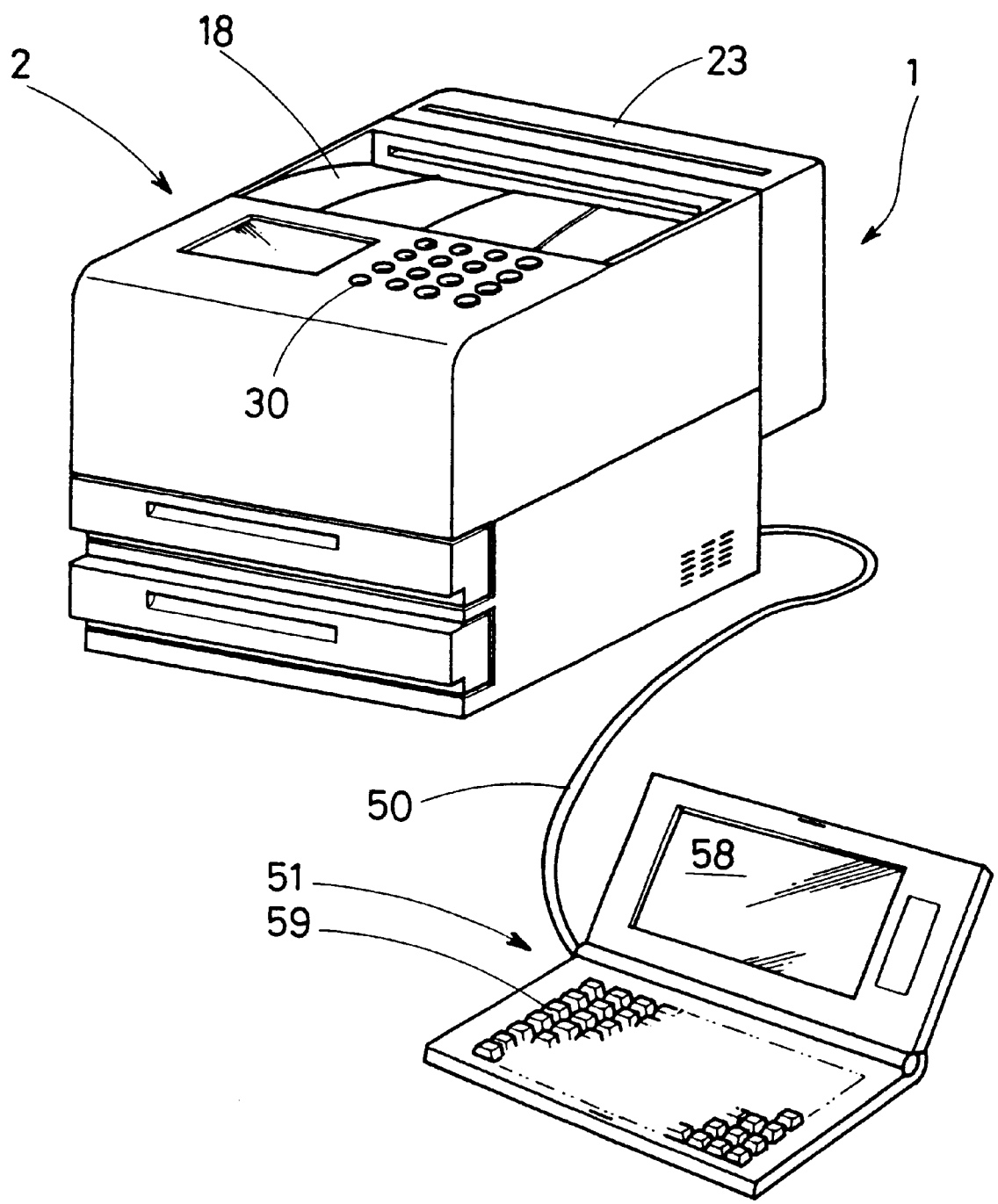
FIG. 1 is a perspective view showing a printing system which includes a printer and a personal computer according to the preferred embodiment of the present invention.

In FIG. 1, it is indicated a printing system 1 in which a laser beam printer 2 (abbreviated as printer hereinafter)

capable of conducting the two-sided printing is connected to a personal computer 3 acting as a host computer through a telecommunication line 50.

Figure 2:
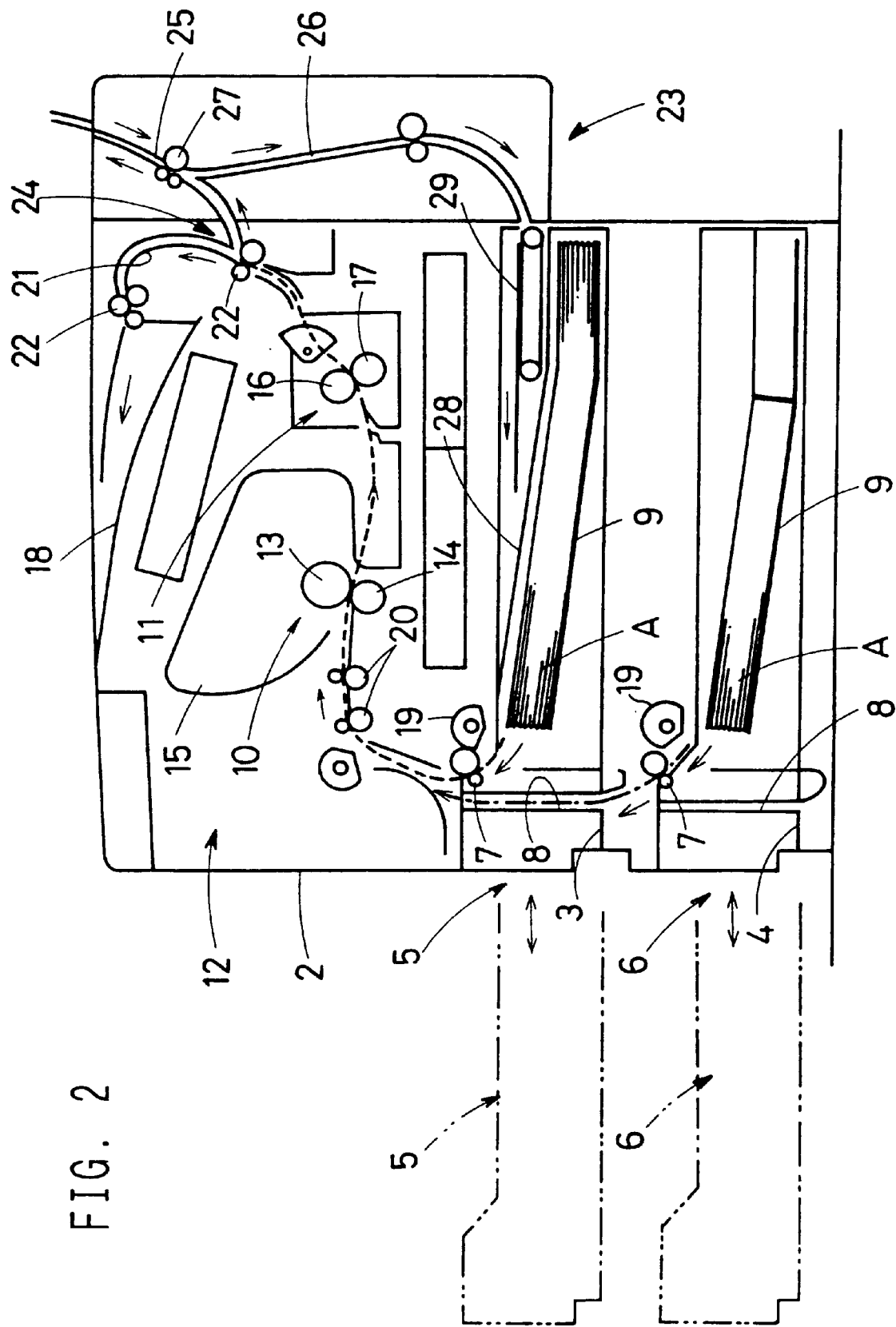
FIG. 2 is a sectional view of the printer.

Here, the printer 2 will be described with reference to FIG. 2. At under position in the printer 2, a first cassette reception part 3 and a second cassette reception part 4 are formed with a top and down relation therebetween. In the first and second cassette reception parts 3, 4, a first sheet supply cassette 5 and a second sheet supply cassette 6 are detachably set, respectively. Here, both the sheet supply cassettes 5, 6 mutually have the same construction, and at the front end of each cassette 5, 6, a supply roller 7 and a vertical slot hole 8 both of which are extended in a direction normal to the drawing sheet, are formed. In each of the sheet supply cassettes 5, 6, a reception plate 9 for resiliently supporting a plural of print sheets A is arranged.

At an upper position of the first sheet supply cassette 5, it is arranged a print part 12 including an image formation unit 10 and a fixation part 11. The image formation unit 10 is constructed from at least an image transmitting roller 14 which is pressed to and rotated with a photosensitive drum 13 arranged within a toner cartridge 15 and a laser scanning device (not shown) which emits laser beam based on print data transmitted form the personal computer 51. And the fixation part 11 is constructed from a pair of rollers 16, 17, one roller 16 being a heat roller and the other being a pressure roller, which are positioned at rear side of a sheet feed path.

In the printer 2, it is formed the sheet feed path through the image formation part 10 and the fixation part 11 and it is constructed in the sheet feed path (shown by the dotted line) feeding mechanism utilized for feeding the print sheet A to an discharge part 18 which is formed on the upper plane of the printer 2.

Pickup rollers 19 for sending the print sheet A are arranged at the front positions of the print sheet A stacked in both the first sheet supply cassette 5 and the second sheet supply cassette 6. Each of the pickup rollers 19 has a half-moon sectional shape so as to be pressed onto the print sheet A by a predetermined angle. And the supply rollers 7 are positioned near the pickup rollers 19.

At the downstream side in the sheet feed path a plurality of rollers 20 are positioned and further at the downstream side of the rollers 20 the sheet feed path is extended through the roller pair of the photosensitive drum 13 and the image transmitting roller 14, the roller pair of heat roller 16 and the pressure roller 17. At the rear end of the sheet feed path, it is constructed a discharge feed path 21 for discharging the print sheet A to the discharge part 18. And at both the entrance and the exit of the discharge feed path 21, a pair of feed rollers 22 are arranged.

On the upper plane of the printer 2, the discharge part 18 is formed and a switching panel 30 for setting various values such as the sheet number to be printed is arranged. At the rear part of the printer 2 (the right side in FIGS. 1 and 2 ), it is formed a reversing unit 23 by which feed direction of the print sheet A passing through the discharge feed path 21 is reversed. And in the printer 2, a diverging part 24 is positioned at the entrance of the discharge feed path 21, thereby the sheet feed path is extended so that the print sheet A is fed toward the reversing unit 23. Here, at the diverging part 24, it is arranged a rotary guide (not shown) which acts for changing the feed direction of the print sheet A by being rotated through an electromagnetic solenoid.

The reversing unit 23 is constructed from a first reversing feed path 25 and a second reversing feed path 26. The lower end of the first reversing feed path 25 is communicated with the diverging part 24 formed in halfway of the discharge feed path 21 in the printer 2, and the upper end thereof is opened upward. Further, the second reversing feed path 26 is downward extended to the first cassette reception part 3 through the diverging part formed in halfway of the first diverging feed path 25. And at the diverging part of the first and second reversing feed paths 25, 26, pairs of rollers 27 capable of reciprocally rotating are positioned.

Figure 3:
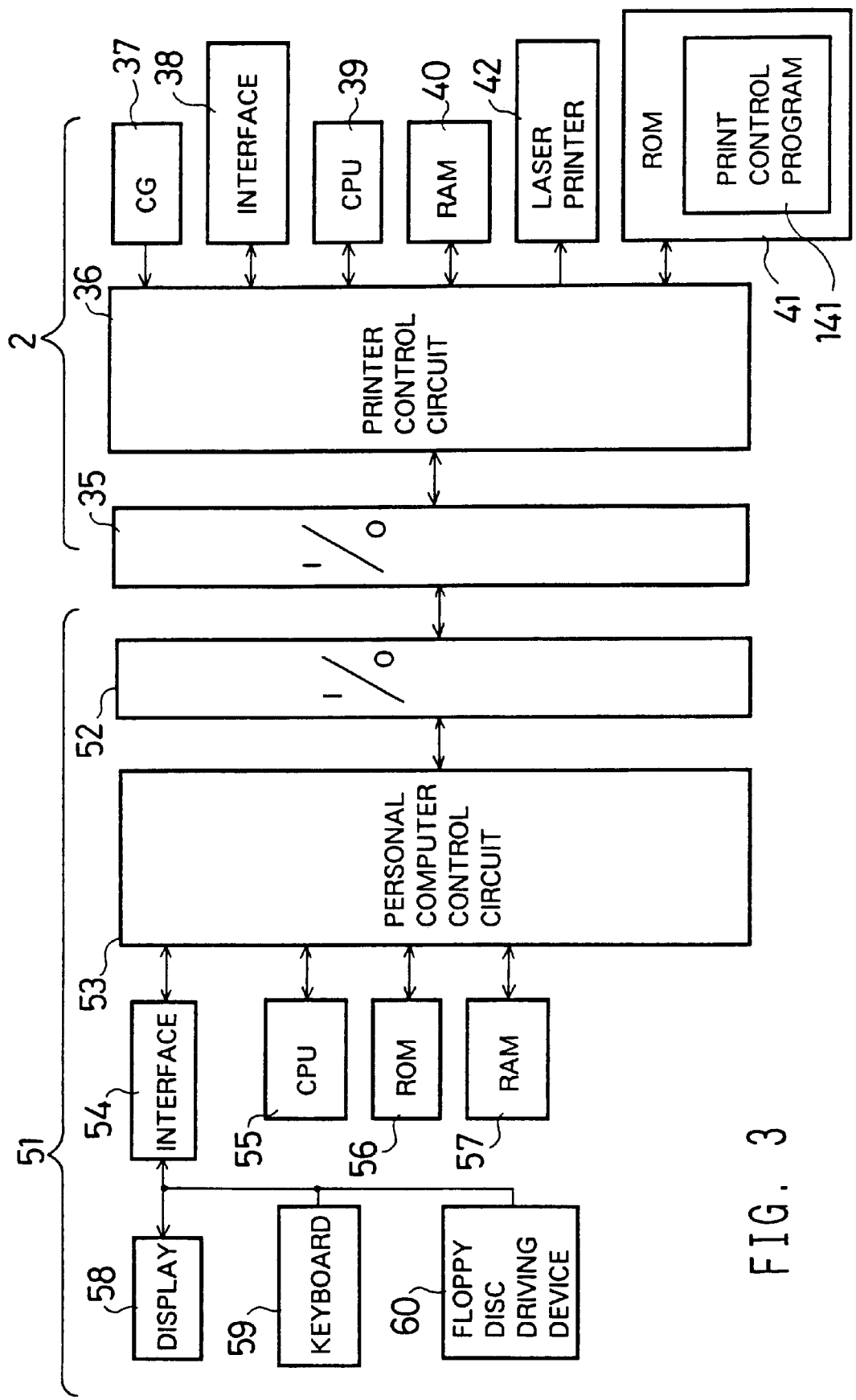
FIG. 3 is a block diagram of the printer and the personal computer in the printing system.

Next, electrical construction of the printing system 1 including the printer 2 and the personal computer 51 will be described with reference to FIG. 3. First, electrical construction of the personal computer 51 will be described. The personal computer 51 has input and output circuit (I/O) 52 by which transmission of various data is conducted with the printer 2 through the telecommunication line 50. To the I/O circuit 52, control circuit 53 for entirely controlling the personal computer 51 is connected. Further, interface 54, CPU 55, ROM 56 storing print control program ( lately mentioned and RAM 57 are connected to the control circuit 53. And to the interface 54, display 58, keyboard 59 and floppy disc driving device 60 are connected.

On the other hand, the printer 2 has input and output circuit (I/O) 35 by which transmission of various data is conducted with the personal computer 51 through the telecommunication line 50. To the I/O circuit 35, printer control circuit 36 is connected. Further, character generator (CG) 37, interface 38, CPU 39, RAM 40, ROM 41 and laser printing device 42 are connected to the printer control circuit 36.

Next, operation of the above mentioned printer 2 will be described. When the pickup roller 19 is rotated, it is slightly pressed onto the front end of the uppermost print sheet A, thereby only the uppermost print sheet A among the print sheets A stacked in the first sheet supply cassette 5 is fed forward based on frictional force occurring between the pickup roller 19 and the uppermost print sheet A, at the same time that the pickup roller 19 is rotated. The fed print sheet A is fed to the sheet feed path in the printer 2 through the supply roller 7, and further is fed to the print part 12 along the sheet feed path after being fed by the rollers 20.

Figure 4:
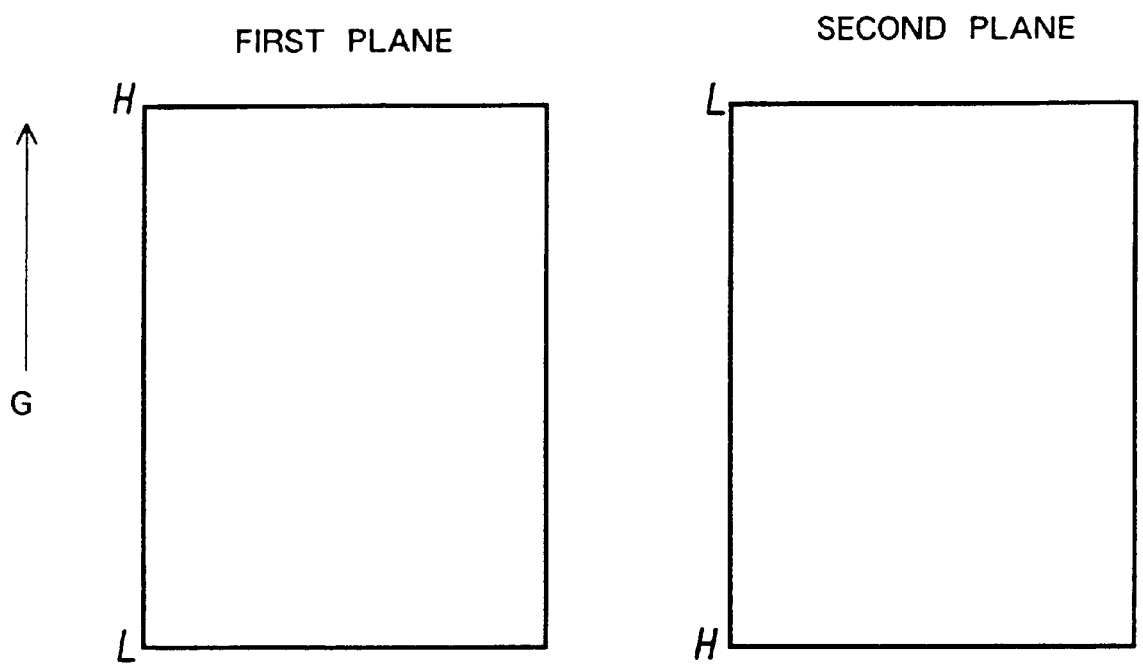
FIG. 4 is a schematic view showing a relation between the feed direction and ends of the print sheet in both the first plane and the second plane thereof.

Thereafter, image printing is conducted on the first plane of the print sheet A in the image formation part 10. At that time, data transmitted from the personal computer 51 through the telecommunication line 50 is converted into printing data by the character generator 37 and the converted print data is stored in the RAM 40. Further, laser beam is emitted from the laser scanning device onto the photosensitive drum 13 based on the printing data stored in the RAM 40, thereby latent image with positive electric charge is formed on the surface of the photosensitive drum 13. Thereafter, toner with negative electric charge is adhered to the latent image on the photosensitive drum 13 and such toner is transmitted onto the print sheet A. The toner on the print sheet A is heated and fixed by the heat roller 16 and the pressure roller 17. As a result, the image is printed on the first plane of the print sheet A. Here, as a matter of convenience, the feed direction of the print sheet A is defined as the direction indicated by an arrow G, as shown in FIG. 4, when image printing is conducted on the first plane of the print sheet A. And at that time, the front end of the print sheet A is represented by H end and the rear end thereof is represented by L end.

In the single-sided printing mode, the rotary guide is operated at the diverging part 24, thus the print sheet A passing through the fixation part 11 is discharged to the discharge part 18 through the discharge feed path 21 in a state that the H end becomes the top end of the print sheet A.

Contrarily, in the two-sided printing mode, after the rotary guide is again operated reversely the print sheet A is fed toward the reversing unit 23 from the diverging part 24. The print sheet A fed to the reversing unit 23 is once fed upward along the first reversing feed path 25 by normally rotating the rollers 27. After the print sheet A is fed upward to a predetermined position, the rollers 27 are switched so as to reversely rotate by a drive motor (not shown), thereby the print sheet A is fed downward along the second reversing feed path 26. Therefore, though the print sheet A is fed so that the H end becomes the top end thereof while existing within the first reversing feed path 25, the print sheet A is reversely fed so that the L end becomes the top end thereof after entering in the second reversing feed path 26. And the print sheet A passing through the second reversing feed path 26 is fed to a feed unit 28. At that time, the print sheet A which is reversed in its feeding direction by the reversing unit 23 so that the L end thereof becomes the feeding top end passes through the feed unit 28 under a condition that inside and outside of the print sheet A is reversed. That is, though image printing is conducted on the first plane (upper plane) of the print sheet A fed from the first sheet supply cassette 5, the second plane of the print sheet A becomes the lower plane in the feed unit 28 after reversed according to the above. And the print sheet A fed to the feed unit 28 is further sent forward, thereafter is again fed to the sheet feed path in the printer 2 through the supply roller 7. The print sheet A is fed out to the discharge part 18 while the L end is retained as the feeding top end after image printing is done on the second plane.

Next, print control which is conducted on the print sheet A will be described. The print control is done as follows. Here, the print control is concretely conducted in the two-sided printing mode depending on whether print order is limited or not according to kind of the print sheet A or whether print direction is limited or not according to kind of the print sheet A. Here, the case that print order is limited corresponds to the case that content to be printed is continuously extended over plural print sheets A. And the case that print direction is limited corresponds to the case that printing is conducted on a print sheet on which company name, for example, is pre-printed.

According to the above, the print control is conducted by the print control program 141 stored in the ROM 41 of the printer 2, depending on the content to be printed and kind of the print sheet A.

First, at the personal computer 51 side, print data is read out from the floppy disc in the floppy disc driving device 60 and is stored in the RAM 57. By operating the keyboard 59, it is displayed a selection image plane shown in FIG. 5(a) on the display 58. Here, the selection image plane is utilized for selecting the kind of print sheet A.

In the selection image plane, the print sheets A in the sheet supply cassettes 5, 6 are classified into four patterns. That is, the print sheet A of the pattern 1 corresponds to the sheet that there is no distinction in its top and bottom and in inside and outside. The print sheet A of the pattern 2 corresponds to the sheet that there is no distinction in its top and bottom, but there is distinction in its inside and outside. The print sheet A of the pattern 3 corresponds to the sheet that there is distinction in its top and bottom, but there is no distinction in inside and outside. And the print sheet A of the pattern 4 corresponds to the sheet that there is distinction in its top and bottom and in inside and outside.

As the sheet in each pattern, the following sheets can be raised. For instance, the pattern 1 corresponds to the case that the sheet in the sheet supply cassettes 5, 6 is a white sheet (paper). The pattern 2 corresponds to the case that the sheet in the sheet supply cassettes 5, 6 is a sheet on one plane of which pre-print 1 (see FIG. 5(a)) is printed, the pre-print 1 having no distinction in its top and bottom such as simply colored pre-print or symmetrical image in top and bottom. The pattern 3 corresponds to the case that the sheet in the sheet supply cassettes 5, 6 is a sheet on both planes of which pre-print 2 (see FIG. 5(a)) is printed, the pre-print 2 having distinction in top and bottom such that the pre-print 2 includes characters printed on the sheet based on a predetermined print direction. Further, the pattern 4 corresponds to the case that the sheet in the sheet supply cassettes 5, 6 is a sheet on one plane of which the pre-print 1 is printed and on the other plane of which the pre-print 2 is printed. Each of the patterns 1–4 is selected by operating key switches on the keyboard 59, thereby the suitable pattern of the sheet to be printed is determined.

Figure 5:
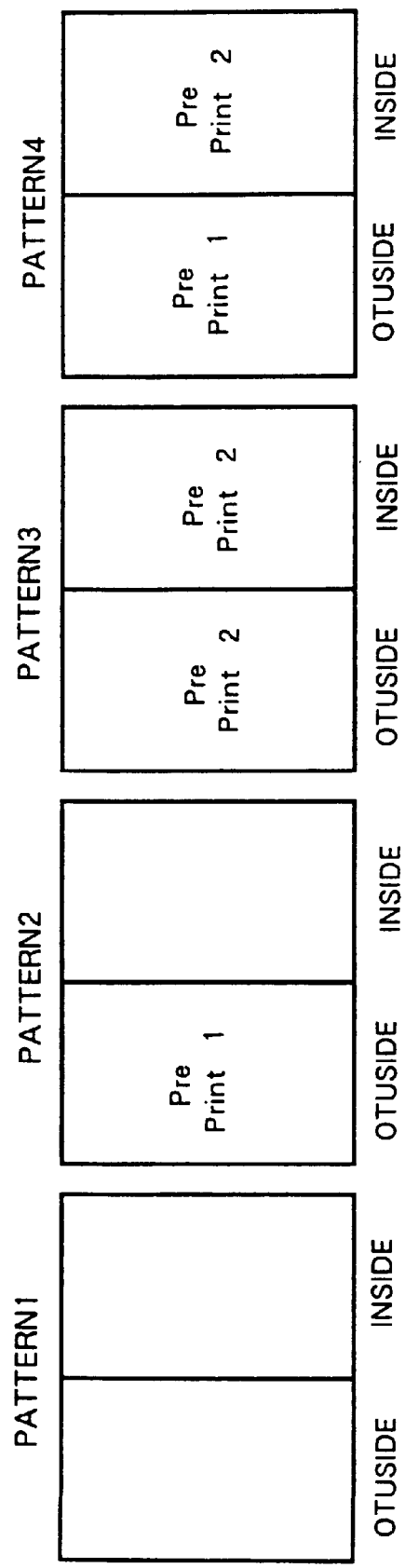
FIGS. 5a and 5b are a schematic view showing a selection image plane displayed on a display of the personal computer.
Figure 5:
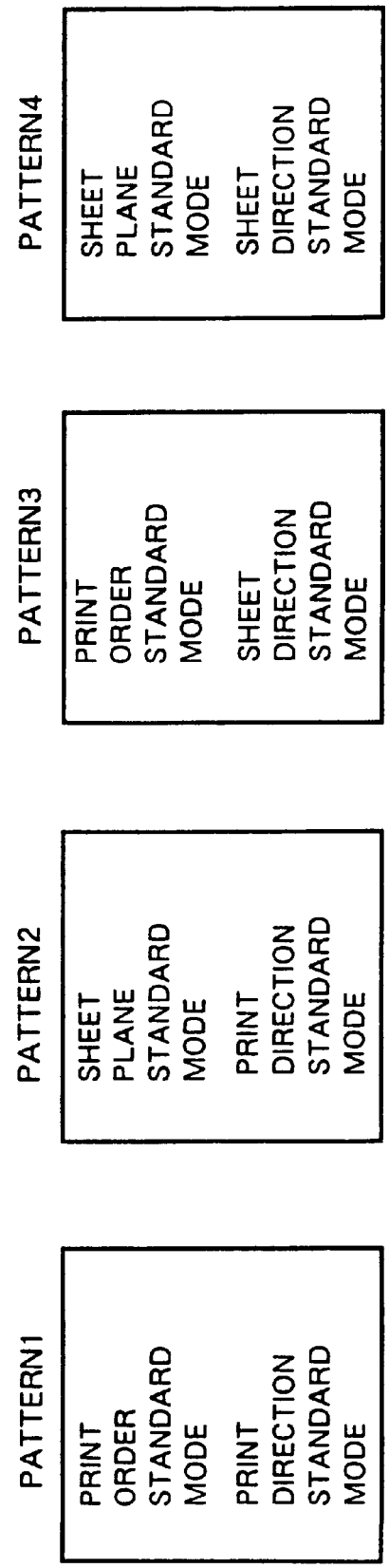

FIG. 5(b) schematically shows selection commands corresponding to each of the patterns 1–4. And when printing is conducted on the print sheet A, the selection command with the print data is transmitted to the printer 2. For example, in case of the pattern 1, that is, in case that printing is conducted on the white sheet, both print order standard command and print direction standard command are transmitted. In case of the pattern 2, that is, in case that printing is conducted on the sheet on one plane of which the pre-print 1 is printed, both sheet plane standard command and the print direction standard command are transmitted. In case of the pattern 3, that is, in case that printing is conducted on the sheet on both planes of which the pre-print 2 is printed, both the print order standard command and sheet direction standard command are transmitted. And in case of the pattern 4, that is, in case that printing is conducted on the sheet on one plane of which the pre-print 1 is printed and on the other plane of which the pre-print 2 is printed, both the sheet plane standard command and the sheet direction standard command are transmitted.

And based on each combination of four standard commands, print control is done according to the print control program 141 in the printer 2. Here, in the two-sided printing mode, under print control based on the print order standard command, when image is formed on one plane of the sheet, the image of the latter page among continuously extended over 2 pages is formed on the sheet and when image is formed on the other plane of the sheet, the image of the former page among image continuously extended over 2 pages is formed on the sheet. Thereby, the image is formed on the sheet so that print order of the image printed on the sheet discharged to the discharge part 18 becomes same in both the single-sided printing mode and the two-sided printing mode.

And in the two-sided printing mode, under print control based on the sheet plane standard command, when image is formed on one plane of the sheet, the image of the former page among continuously extended over 2 pages is formed on the sheet and when image is formed on the other plane of the sheet, the image of the latter page among continuously extended over 2 pages is formed on the sheet. Thereby, the image is formed on the sheet so that sheet plane itself and the print order of the image printed on the sheet become same in both the single-sided printing mode and the two-sided printing mode.

Further, in the two-sided printing mode, under print control based on the print direction standard command, when image is formed on the first plane of the sheet, the image is formed on the sheet based on the print format which is obtained by rotating 180° the print format in single-sided printing mode while feeding the sheet upward in the printer 2, and on the contrary, when image is formed on the second plane of the sheet reversed, the image is formed on the sheet based on the print format which is as same as the print format in single-sided printing mode.

And in the two-sided printing mode, under print control based on the sheet direction standard command, when image is formed on the first plane of the sheet, the image is formed on the sheet based on the print format which is as same as the print format in single-sided printing mode, and on the contrary, when image is formed on the second plane of the sheet reversed, the image is formed on the sheet based on the print format which is obtained by rotating 180° the print format in single-sided printing mode.

Figure 6:
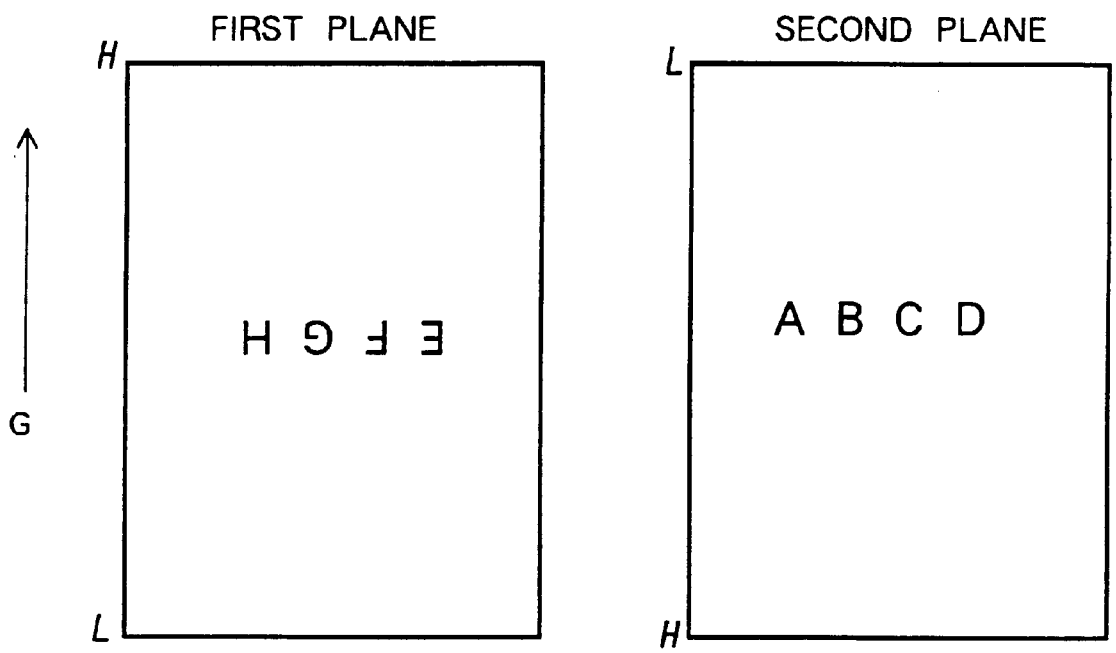
FIG. 6 is a schematic view showing printing state when pattern 1 is selected on the selection image plane.

Thus, in case of the pattern 1, when the print order standard command and the print direction standard command are transmitted with the print data to the printer 2 in which white sheets having both white planes are set in the first sheet supply cassette 5, the CPU 39 executes the print control program 141 stored in the ROM 41. In this case, printing is conducted under the two-sided printing mode as shown in FIG. 6.

First, when both the print order standard command and the print direction standard command are recognized by the CPU 39, the print data (stored in the RAM 40) of the latter page among continuously extended over 2 pages is converted into the print data which is obtained by rotating 180° the print format according to the same direction as the feed direction G in the single-sided printing mode and thereby has the print format of the direction opposite to the feed direction G. And such print data is printed on the first plane of the print sheet A fed so that the H end becomes the feed top end.

Further, the print sheet A is fed to the reversing unit 23 and is reversed therein. Thereafter, the print sheet A is again fed to the image formation unit 10 and image printing is conducted on the second plane thereof. At that time, the print data of the former page is printed on the second plane along the same direction as the feed direction G in the single-sided printing mode.

Therefore, image printing is conducted on both the first plane and the second plane in the two-sided printing mode so that the L end becomes the feed top end (upper end), thereby the print sheet A is discharged to the discharge part 18 so that the print direction coincides with each other in both the single-sided printing mode and the two-sided printing mode. Further, the print sheet A is discharged to the discharge part 18 so that the second plane, on which the print data of the former page among image continuously extended over 2 pages, becomes the under plane. Thereby, the print sheets A are discharged so that the page numbers thereof are made serial number when image printing is conducted over plural pages.

Figure 7:
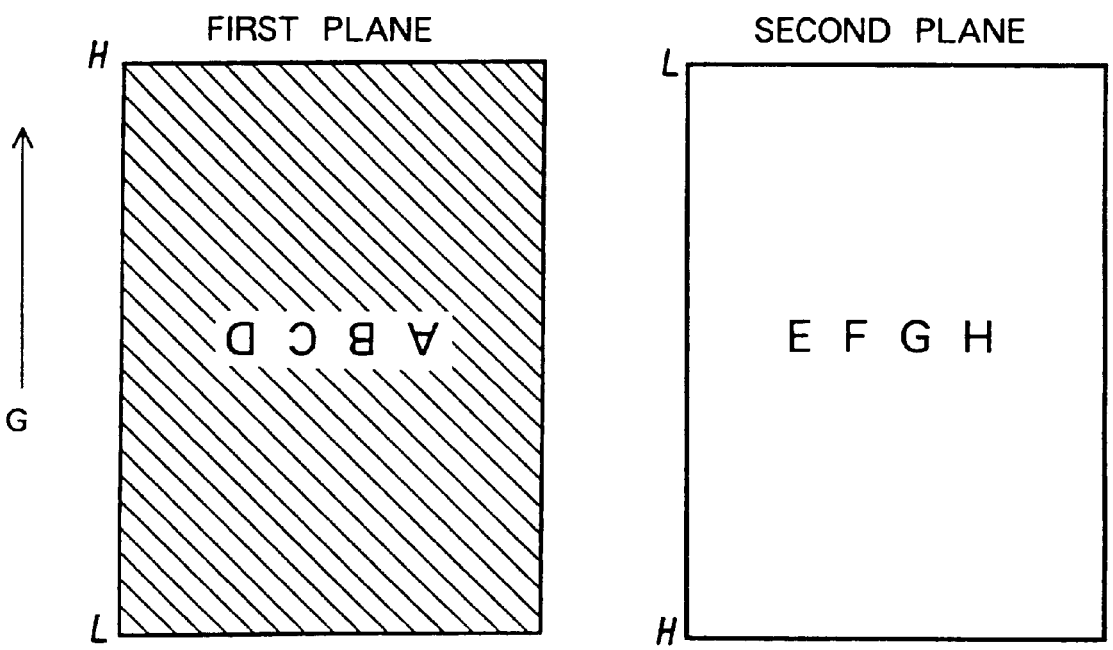
FIG. 7 is a schematic view showing printing state when pattern 2 is selected on the selection image plane.

In case of the pattern 2, when the sheet plane standard command and the print direction standard command are transmitted with the print data to the printer 2 in which sheets having the pre-print 1 on the first plane (here, the pre-print 1 is color print) are set in the first sheet supply cassette 5, the CPU 39 executes the print control program 141 stored in the ROM 41. In this case, printing is conducted under the two-sided printing mode as shown in FIG. 7.

First, when both the sheet plane standard command and the print direction standard command are recognized by the CPU 39, the print data (stored in the RAM 40) of the former page among continuously extended over 2 pages is converted into the print data which is obtained by rotating 180° the print format according to the same direction as the feed direction G in the single-sided printing mode and thereby has the print format of the direction opposite to the feed direction G. And such print data is printed on the first plane of the print sheet A fed so that the H end becomes the feed top end.

Further, the print sheet A is fed to the reversing unit 23 and is reversed therein. Thereafter, the print sheet A is again fed to the image formation unit 10 and image printing is conducted on the second plane thereof. At that time, the print data of the latter page is printed on the second plane along the same direction as the feed direction G in the single-sided printing mode.

Therefore, image printing is conducted on the first plane on which the pre-print 1 is printed so that the print data of the former page among continuously extended over 2 pages is printed in both the single-sided printing mode and the two-sided printing mode, without changing the print sheets A in the sheet supply cassettes 5, 6. Further, image printing is conducted on both the first plane and the second plane in the two-sided printing mode so that the L end becomes the feed top end (upper end), thereby the print sheet A is discharged to the discharge part 18 so that the print direction coincides with each other in both the single-sided printing mode and the two-sided printing mode.

Figure 8:
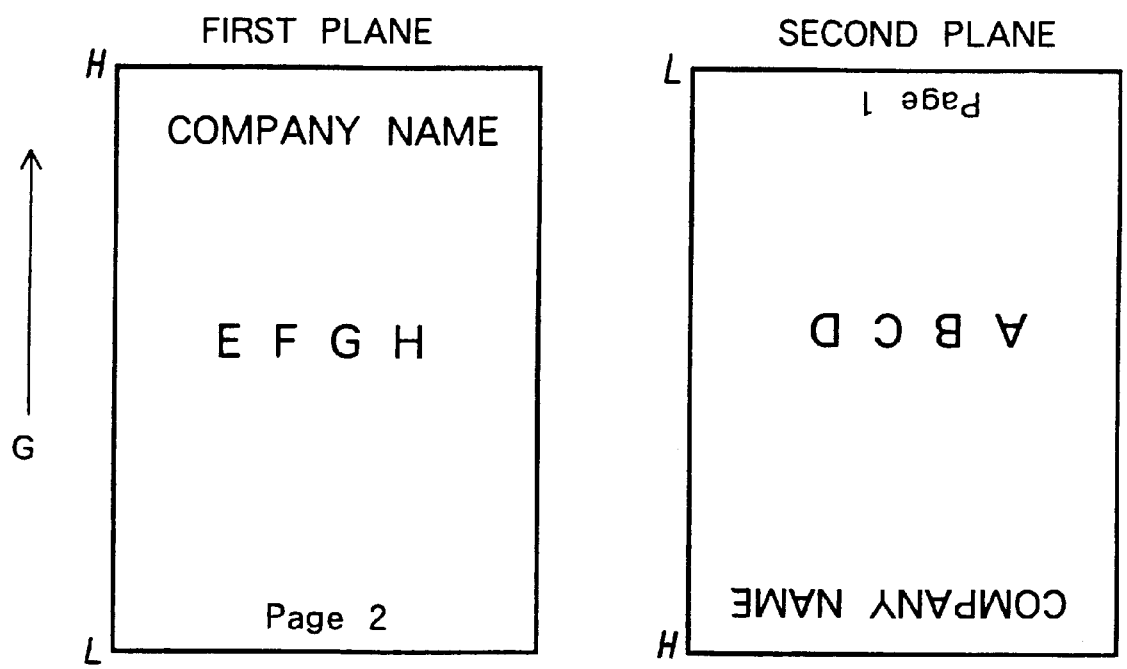
FIG. 8 is a schematic view showing printing state when pattern 3 is selected on the selection image plane.

In case of the pattern 3, when the print order standard command and the sheet direction standard command are transmitted with the print data to the printer 2 in which sheets having the pre-print 2 on both the first and second planes (here, company name is printed on both the first and second planes so that the H end becomes the upper end) are set in the first sheet supply cassette 5, the CPU 39 executes the print control program 141 stored in the ROM 41. In this case, printing is conducted under the two-sided printing mode as shown in FIG. 8.

First, when both the print order standard command and the sheet direction standard command are recognized by the CPU 39, the print data (stored in the RAM 40) of the latter page among continuously extended over 2 pages is printed on the first plane of the print sheet A fed so that the H end becomes the feed top end according to the direction same as the feed direction G in the single-sided printing mode.

Further, the print sheet A is fed to the reversing unit 23 and is reversed therein. Thereafter, the print sheet A is again fed to the image formation unit 10 and image printing is conducted on the second plane thereof. At that time, the print data of the former page among continuously extended over 2 pages is converted into the print data which is obtained by rotating 180° the print format according to the same direction as the feed direction G in the single-sided printing mode and thereby has the print format of the direction opposite to the feed direction G. And such print data is printed on the second plane of the print sheet A fed so that the L end becomes the feed top end.

Therefore, though the reversed print sheet A is sent to the image formation part 10 so that the L end becomes the feed top end, image printing is also conducted on the second plane so that the H end becomes the top end, similar to the case that image printing is conducted on the first plane. Thus, since image printing is conducted on both the first plane and the second plane so that the H end becomes the top end, the print data can be printed on both the first and second planes in both the single-sided printing mode and the two-sided printing mode without changing the print sheets A in the sheet supply cassettes 5, 6 under the condition that company name (pre-print 2) and print content suitably coincide with each other. Further, the print sheet A is discharged to the discharge part 18 so that the second plane, on which the print data of the former page among image continuously extended over 2 pages, becomes the under plane. Thereby, the print sheets A are discharged so that the page numbers thereof are made serial number when image printing is conducted over plural pages.

Figure 9:
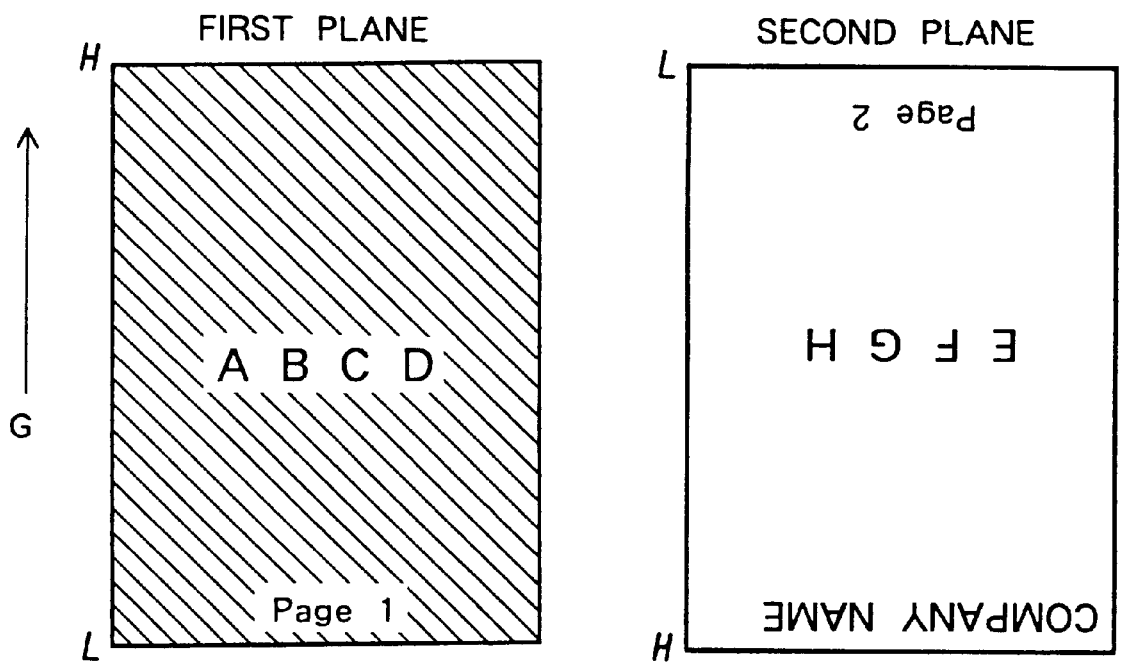
FIG. 9 is a schematic view showing printing state when pattern 4 is selected on the selection image plane.

In case of the pattern 4, when the sheet plane standard command and the sheet direction standard command are transmitted with the print data to the printer 2 in which sheets having the pre-print 1 on the first plane and pre-print 2 on the second plane (here, the pre-print 1 on the first plane is color print and the pre-print 2 is company name printed on the second plane so that the H end becomes the upper end) are set in the first sheet supply cassette 5, the CPU 39 executes the print control program 141 stored in the ROM 41. In this case, printing is conducted under the two-sided printing mode as shown in FIG. 9.

First, when both the sheet plane standard command and the sheet direction standard command are recognized by the CPU 39, the print data (stored in the RAM 40) of the former page among continuously extended over 2 pages is printed on the first plane of the print sheet A fed so that the H end becomes the feed top end according to the direction same as the feed direction G in the single-sided printing mode.

Further, the print sheet A is fed to the reversing unit 23 and is reversed therein. Thereafter, the print sheet A is again fed to the image formation unit 10 and image printing is conducted on the second plane thereof. At that time, the print data of the latter page among continuously extended over 2 pages is converted into the print data which is obtained by rotating 180° the print format according to the same direction as the feed direction G in the single-sided printing mode and thereby has the print format of the direction opposite to the feed direction G. And such print data is printed on the second plane of the print sheet A fed so that the L end becomes the feed top end.

Therefore, though the reversed print sheet A is sent to the image formation part 10 so that the L end becomes the feed top end, image printing is also conducted on the second plane so that the H end becomes the top end, similar to the case that image printing is conducted on the first plane. Thus, since image printing is conducted on both the first plane and the second plane so that the H end becomes the top end, the print data can be printed on both the first and second planes in both the single-sided printing mode and the two-sided printing mode without changing the print sheets A in the sheet supply cassettes 5, 6 under the condition that company name (pre-print 2) and print content suitably coincide with each other. Further, image printing is conducted on the first plane on which the pre-print 1 is printed so that the print data of the former page among continuously extended over 2 pages is printed in both the single-sided printing mode and the two-sided printing mode, without changing the print sheets A in the sheet supply cassettes 5, 6.

By the way, in the above embodiment, though the CPU 39 in the printer 2 controls print operation according to the print control program 141 stored in the ROM 41 after receiving various commands transmitted from the personal computer 51, it is conceivable as the other embodiment that the CPU 55 in the personal computer 51 controls the same print operation.

In this case, the print control program similar to the print control program 141 is stored in the ROM 56 of the personal computer 51 and the CPU 55 conducts print control according to such print control program.

For example, the print data to be printed is read out from the floppy disc (memory medium) set in the floppy disc driving device 60 and the read print data is stored in the RAM 57. Similar to the above embodiment, the selection image plane shown in FIG. 5(a) is displayed on the display 58 by operating the keyboard 59. When it is selected by the keyboard 59 one pattern (mode) among patterns 1–4 (pattern 1 is defined by the combination of the print order standard command and the print direction standard command; pattern 2 is defined by the combination of the sheet plane standard command and the print direction standard command; pattern 3 is defined by the combination of the print order standard command and the sheet direction standard command; pattern 4 is defined by the combination of the sheet plane standard command and the sheet direction standard command), the print data is converted according to the selected pattern. The converted print data is stored in the RAM 57. Here, under each mode, data processing is conducted based on the command combination shown in FIG. 5(b).

And the print data processed in the personal computer 51 is transmitted to the printer 2 through the telecommunication line 50 and stored in the RAM 40 of the printer 2, thereafter print operation is conducted by the CPU 39 according to the similar manner already mentioned.

Further, in the above embodiments, though the command combination is selected by operating the keyboard 59, it is conceivable that two flags, one for defining inside and outside of the print sheet A and the other for defining top and bottom thereof (that is, print direction), are formed in the RAM 57 and the command combination is selected based on the combination of ON and OFF state in each flag. It will be described the manner to select the command combination by using the flags, according to the flowchart shown in FIG. 10. The command combination, that is, print condition is set according to this flowchart. As the two flags, both the flag A indicating whether there is distinction of inside and outside in the print sheet or not and the flag B indicating whether there is distinction of print (sheet) direction in the print sheet or not, are formed in the RAM 57.

Figure 10:
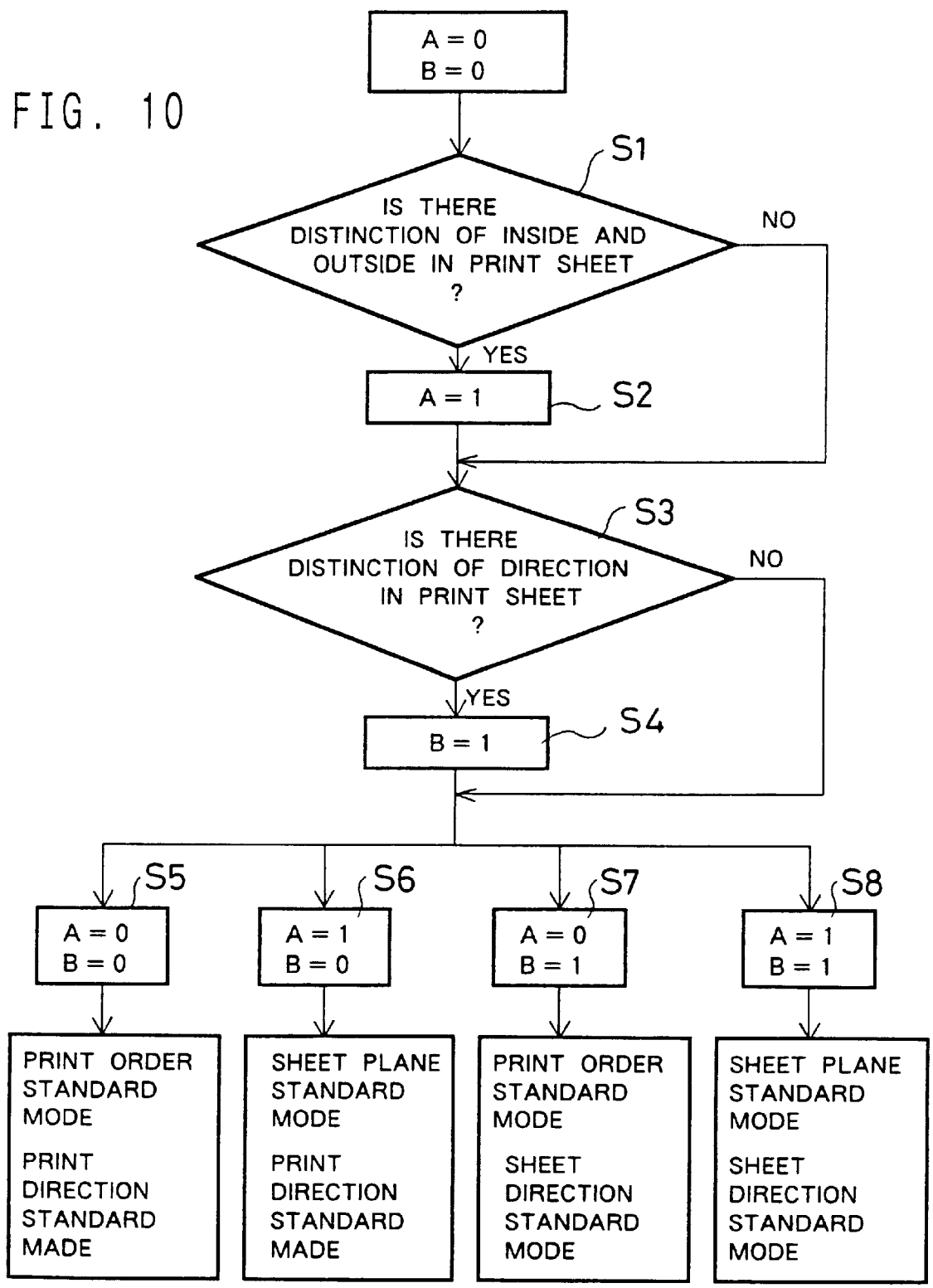
FIG. 10 is a flowchart to select various printing conditions.

In FIG. 10, both the flag A and the flag B are first set to 0. When the program is started, it is judged in S1 whether there is distinction of inside and outside in the print sheet. At this time, the user operates the keyboard to answer the question in S1. If judged that there is distinction of inside and outside in the print sheet based on key operation (S1:YES), the flag A is set to 1 in S2. On the other hand, if judged that there is no distinction of inside and outside of the print sheet (S1:NO), the flag A is retained to 0 and the procedure shifts to S3.

In S3, it is judged whether there is distinction of print direction in the print sheet. At this time, the user operates the keyboard 59 to answer the question in S3. If judged that there is distinction of print direction in the print sheet based on key operation (S3:YES), the flag B is set to 1 in S4. On the contrary, if judged that there is no distinction of print direction in the print sheet (S3:NO), the flag B is retained to 0 and the procedure shifts to the next process (S5–S8).

After the above procedure through S1–S4, each of the flags A, B is set to 1 or 0. Therefore, it can be set the command combination by recognizing ON (1) and OFF (0) state of the flags A, B. Further, print control is conducted in S5–S6 based on the print condition determined by the command combination, similar to the above embodiments.

Here, for instance, both the flag A and the flag B are set to 0 in S5. This case corresponds to the command combination of the print order standard command and the print direction standard command. Therefore, this case corresponds to pattern 1.

And in S6, the flag A is set to 1 and the flag B is set to 0. This case corresponds to the command combination of the sheet plane standard command and the print direction standard command. Therefore, this case corresponds to pattern 2.

Further in S7, the flag A is set to 0 and the flag B is set to 1. This case corresponds to the command combination of the print order standard command and the sheet direction standard command. Therefore, this case corresponds to pattern 3.

And in S8, both the flag A and the flag B are set to 1. This case corresponds to the command combination of the sheet plane standard command and the sheet direction standard command. Therefore, this case corresponds to pattern 4.

As mentioned in detail, according to the printing system 1 of the embodiment, the print order and the print direction can be flexibly changed corresponding to kind of the print sheet A, therefore page numbers of the print sheets A printed under the two-sided printing mode can be serially ordered in the state that the print sheets A are discharged to the discharge part 18, even if it is used the printer 2 capable of conducting the two-sided printing by reversing the feed direction of the print sheet A.

And when image printing is conducted on the print sheet A having the pre-print such as the pre-print 1 or the pre-print 2 thereon under both the single-sided printing mode and the two-sided printing mode, image printing can be done in both modes according to the direction coinciding with the direction of the pre-print.

Further, it can put in order the print direction of the print sheet A discharged to the exhaust part 18 even under the print mode in which the single-sided printing mode and the two-sided printing mode are mixed together.

Therefore, according to the printing system 1 of the embodiment, it can avoid the problems occurring in the print order and the print direction due to that the print sheet A is reversed, in addition to the above effects.

While the invention has been particularly shown and described with reference to preferred embodiments thereof, it will be understood by those skilled in the art that the foregoing and other changes in form and details can be made therein without departing from the spirit and scope of the invention.

For example, though only four kinds of the print sheet A corresponding to pattern 1 to pattern 4 (see FIG. 5(a)) are utilized in the embodiment, it can use the print sheet that the pre-print 2 such as company name is printed on the first plane and new pre-print 3 such as characters is printed on the second plane so that characters are printed in the print direction opposite to the print direction of the pre-print 2 on the first plane.

And though the command combination necessary to determine the print condition is set based on two standard commands concerning with the print direction and the print order in the embodiment, it can use the other standard different from the above according to kind of the print sheet or discharge state thereof. For example, it is conceivable a case that image printing is conducted on both planes along the same print direction used in the single-sided printing mode under the two-sided printing mode.

Further, though the print sheet having the pre-print thereon is used in the embodiment, loose-lief papers with holes at one side thereof can be utilized.

What is claimed is:

1. A printing control apparatus including image formation means for forming image on a print sheet, sheet supply means for supplying the print sheet to the image formation means, reversing means for reversing feed direction of the print sheet having the image formed thereon, discharge means for discharging the print sheet after image formation is completed, the printing control apparatus having single-sided printing mode under which the print sheet in the sheet supply means is supplied to the image formation means while retaining one end thereof as a feed top end and is discharged by the discharge means while retaining the one end thereof as the feed top end after the image is formed on one plane of the print sheet, and two-sided printing mode under which the print sheet in the sheet supply means is supplied to the image formation means while retaining one end thereof as a feed top end and is returned to the sheet supply means while retaining the other end thereof as the feed top end by the reversing means after the image is formed on one plane of the print sheet, thereafter the print sheet is again supplied to the image formation means while retaining the other end thereof as the feed top end and is discharged by the discharge means while retaining the other end thereof as the feed top end after the image is formed on the other plane of the print sheet, each plane of said print sheet having a plane state defined by whether there is at least one of a distinction of inside and outside of the print sheet and a distinction of top and bottom of the print sheet, the printing control apparatus comprising:

print order standard mode that the image of a first page among continuous two pages is formed on the one plane of the print sheet when the image is formed on the one plane under the two-sided printing mode and the image of a second page among continuous two pages is formed on the other plane of the print sheet when the image is formed on the other plane, thereby print order of the print sheet discharged by the discharge means becomes same under both the single-sided printing mode and the two-sided printing mode;

sheet plane standard mode that the image of the second page among continuous two pages is formed on the one plane of the print sheet when the image is formed on the one plane under the two-sided printing mode and the image of the first page among continuous two pages is formed on the other plane of the print sheet when the image is formed on the other plane, thereby sheet plane on which the image is formed becomes same under both the single-sided printing mode and the two-sided printing mode;

display means for displaying information patterns including plane states of the one plane and the other plane of the print sheet to be used corresponding to the print order standard mode and the sheet plane standard mode, each information pattern being displayed based on whether there is distinction of inside and outside of the print sheet; and first mode selection means for selecting one of the print order standard mode and the sheet plane standard mode according to the information pattern displayed on the display means.

2. The printing control apparatus according to claim 1, wherein the first mode selection means selects the print order standard mode when the information pattern indicating that there is no distinction of inside and outside in the print sheet is displayed on the display means and selects the sheet plane standard mode when the information pattern indicating that there is distinction of inside and outside in the print sheet is displayed on the display means.

3. The printing control apparatus according to claim 2, further comprising:

print direction standard mode that the image is formed on the one plane of the print sheet based on first print format obtained by rotating 180° print format in the single-sided printing mode when the image is formed on the one plane under the two-sided printing mode and the image is formed on the other plane of the print sheet based on second print format same as the print format of the single-sided printing mode when the image is formed on the other plane, thereby sheet discharge direction and print direction mutually coincide under both the single-sided printing mode and the two-sided printing mode; and sheet direction standard mode that the image is formed on the one plane of the print sheet based on the second print format when the image is formed on the one plane under the two-sided printing mode and the image is formed on the other plane of the print sheet based on the first print format when the image is formed on the other plane, thereby sheet direction itself and the print direction mutually coincide under both the single-sided printing mode and the two-sided printing mode.

4. The printing control apparatus according to claim 3, wherein the display means further displays information patterns including plane states of the one plane and the other plane or the print sheet to be used corresponding to the print direction standard mode and the sheet direction standard mode, each information pattern being displayed based on whether there is distinction of top and bottom or the print sheet.

5. The printing control apparatus according to claim 4, further comprising second mode selection means for selecting one of the print direction standard mode and the sheet direction standard mode according to the information pattern displayed on the display means.

6. The printing control apparatus according to claim 5, wherein the second mode selection means selects the print direction standard mode when the information pattern indicating that there is no distinction of top and bottom in the print sheet is displayed on the display means and selects the sheet direction standard mode when the information pattern indicating that there is distinction of top and bottom in the print sheet is displayed on the display means.

7. The printing control apparatus according to claim 6, wherein the apparatus includes a personal computer with a keyboard and a printer with a first controller, a first memory for the printer being connected to the personal computer through a telecommunication line.

8. The printing control apparatus according to claim 7, wherein the print order standard mode, the sheet plane standard mode, the print direction standard mode and the sheet direction standard mode are stored in the first memory means and the first controller conducts print control based on each standard mode in the first memory means.

9. The printing control apparatus according to claim 7, wherein the first and second input means, the first and second mode selection means are arranged in the keyboard.

10. The printing control apparatus according to claim 7, wherein the personal computer further has a second controller and a second memory.

11. The printing control apparatus according to claim 10, wherein the print order standard mode, the sheet plane standard mode, the print direction standard mode and the sheet direction standard mode are stored in the second memory and the second controller conducts print control based on each standard mode in the second memory.

12. The printing control apparatus according to claim 11, wherein the second memory means has first flag memory representable the print order standard mode or the sheet plane standard mode based on its state and second flag memory representable the print direction mode or the sheet direction mode based on its state.

13. The printing control apparatus according to claim 12, wherein the second controller determines each standard mode based on the states of the first and second flag memories.

14. The printing control apparatus according to claim 6, wherein the first mode selection means selects the print order standard mode and the second selection means selects the print direction standard mode when the print sheet is a white sheet that both the one and the other planes are white.

15. The printing control apparatus according to claim 6, wherein the first mode selection means selects the sheet plane standard mode and the second selection means selects the print direction standard mode when the print sheet is a sheet that the one plane has first pre-print with distinction of inside and outside and the other plane is white.

16. The printing control apparatus according to claim 6, wherein the first mode selection means selects the print order standard mode and the second selection means selects the sheet direction standard mode when the print sheet is a sheet that both the one and the other planes have second pre-prints with distinction of top and bottom.

17. The printing control apparatus according to claim 6, wherein the first mode selection means selects the sheet plane standard mode and the second selection means selects the sheet direction standard mode when the print sheet is a sheet that the one plane has first pre-print with distinction of inside and out side and the other plane has second pre-print with distinction of top and bottom.

18. A printing control apparatus including image formation means for forming image on a print sheet, sheet supply means for supplying the print sheet to the image formation means, reversing means for reversing feed direction of the print sheet having the image formed thereon, discharge means for discharging the print sheet after image formation is completed, the printing control apparatus having single-sided printing mode under which the print sheet in the sheet supply means is supplied to the image formation means while retaining one end thereof as a feed top end and is discharged by the discharge means while retaining the one end thereof as the feed top end after the image is formed on one plane of the print sheet, and two-sided printing mode under which the print sheet in the sheet supply means is supplied to the image formation means while retaining one end thereof as a feed top end and is returned to the sheet supply means while retaining the other end thereof as the feed top end by the reversing means after the image is formed on one plane of the print sheet, thereafter the print sheet is again supplied to the image formation means while retaining the other end thereof as the feed top end and is discharged by the discharge means while retaining the other end thereof as the feed top end after the image is formed on the other plane of the print sheet, each plane of said print sheet having a plane state defined by whether there is at least one of a distinction of inside and outside of the print sheet and a distinction of top and bottom of the print sheet, the printing control apparatus comprising:

print direction standard mode that the image is formed on the one plane of the print sheet based on first print format obtained by rotating 180° print format in the single-sided printing mode when the image is formed on the one plane under the two-sided printing mode and the image is formed on the other plane of the print sheet based on second print format same as the print format of the single-sided printing mode when the image is formed on the other plane, thereby sheet discharge direction and print direction mutually coincide under both the single-sided printing mode and the two-sided printing mode;

sheet direction standard mode that the image is formed on the one plane of the print sheet based on the second print format when the image is formed on the one plane under the two-sided printing mode and the image is formed on the other plane of the print sheet based on the first print format when the image is formed on the other plane, thereby sheet direction itself and the print direction mutually coincide under both the single-sided printing mode and the two-sided printing mode;

display means for displaying information patterns including plane states of the one plane and the other plane of the print sheet to be used corresponding to the print direction standard mode and the sheet direction standard mode, each information pattern being displayed based on whether there is distinction of top and bottom of the print sheet; and second mode selection means for selecting one of the print direction standard mode and the sheet direction standard mode according to the information pattern displayed on the display means.

19. The printing control apparatus according to claim 18, wherein the second mode selection means selects the print direction standard mode when the information pattern indicating that there is no distinction of top and bottom in the print sheet is displayed on the display means and selects the sheet direction standard mode when the information pattern indicating that there is distinction of top and bottom in the print sheet is displayed on the display means.

* * * * *